(12) United States Patent
Komiyama

(10) Patent No.: US 6,196,752 B1
(45) Date of Patent: Mar. 6, 2001

(54) PIVOT STRUCTURE FOR VEHICLE WIPER DEVICE

(75) Inventor: Takashi Komiyama, Kiryu (JP)

(73) Assignee: Mitsuba Corporation, Kiryu (JP)

( * ) Notice: Subject to any disclaimer, the term of this patent is extended or adjusted under 35 U.S.C. 154(b) by 0 days.

(21) Appl. No.: 09/276,449

(22) Filed: Mar. 25, 1999

(30) Foreign Application Priority Data

Mar. 31, 1998 (JP) ................................................. 10-103830

(51) Int. Cl.$^7$ ............................... F16C 11/00; F16D 1/12; A47L 1/00
(52) U.S. Cl. ........................ 403/34; 403/38; 403/39; 15/250.3; 15/250.31; 15/250.34
(58) Field of Search .................... 403/161, 119, 403/164, 34, 37, 38, 39; 15/250.3, 250.31, 250.34; 296/96.15

(56) References Cited

U.S. PATENT DOCUMENTS

| | | | |
|---|---|---|---|
| 5,067,198 | * 11/1991 | Ishikawa et al. | 15/250.31 X |
| 5,440,842 | * 8/1995 | Sorkin | 52/223.13 |
| 5,895,025 | * 4/1999 | Alesi et al. | 248/678 |
| 5,960,512 | * 10/1999 | Schael et al. | 15/250.31 |

FOREIGN PATENT DOCUMENTS

| | | | |
|---|---|---|---|
| 1816835 | * 7/1969 | (DE) | 15/250.3 |
| 1900185 | * 10/1970 | (DE) | 15/250.3 |
| 2352535 | * 4/1975 | (DE) | 15/250.3 |
| 2911155 | * 9/1980 | (DE) | 15/250.31 |
| 4323551 | * 1/1994 | (DE) | 15/250.3 |
| 50057 | * 3/1991 | (JP) | 15/250.34 |

* cited by examiner

Primary Examiner—Lynne H. Browne
Assistant Examiner—Ernesto Garcia
(74) Attorney, Agent, or Firm—Oliff & Berridge, PLC (57) ABSTRACT

A pivot structure for a vehicle wiper device is provided. The pivot structure prevents foreign matters from invading through a body exterior sheet into a dash board area, for example. The pivot structure may be used in both left-side-drive vehicles and right-side-drive vehicles. A first regulating rib and second regulating rib are formed on respective fixing pieces, which extend from the outside periphery of a pivot holder. The first and second ribs are formed symmetrically with respect to an imaginary line X passing through the center axis of the pivot shaft on the right side and the left side.

16 Claims, 7 Drawing Sheets

PIVOT STRUCTURE FOR VEHICLE WIPER DEVICE

BACKGROUND OF THE INVENTION

1. Field of Invention

The present invention relates to a pivot structure for a vehicle wiper device. In particular, the invention relates to a pivot structure for a vehicle wiper mounted on passenger cars, buses, and trucks, for example.

2. Description of Related Art

Figure 7A:
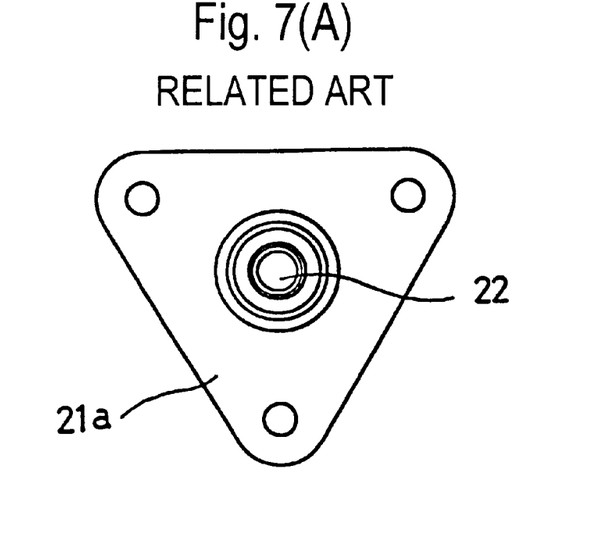
FIG. 7A is a plan view showing a conventional wiper device and 7B is a front elevational view, partly in cross section, showing a conventional wiper device.
Figure 7B:
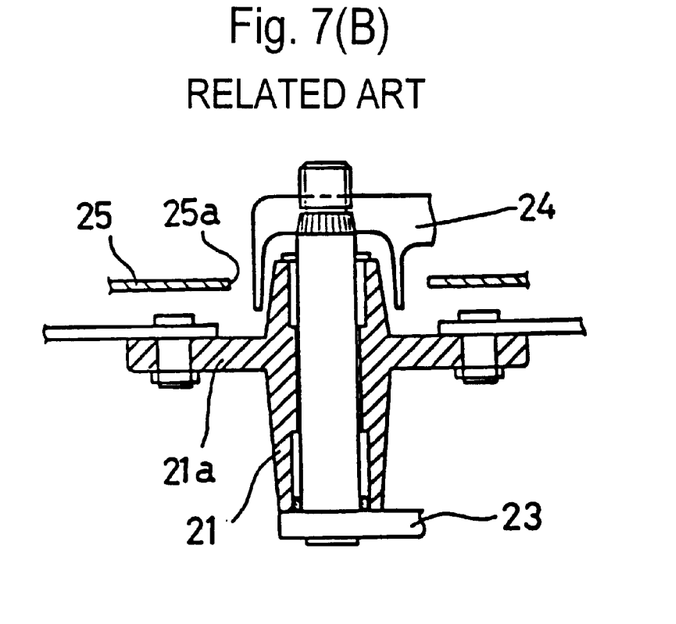

In general, vehicles are equipped with a wiper device for wiping the window surface of a windshield and the like. As shown in FIGS. 7(A) and 7(B), a known wiper device is arranged such that a pivot shaft 22 is rotatably supported by a pivot holder 21 fixed to a body, and specifically a body exterior sheet. A link arm 23, which is coupled with a motor (not shown), is fixed to the base end of the pivot shaft 22. A wiper arm 24 is fixed to the extreme end of the pivot shaft 22. With this arrangement, when the motor is driven, the wiper arm 24 is reciprocatingly circularly moved about the pivot shaft 22, as a swing support shaft, so as to perform a wiping motion.

The wiper device is arranged such that a pivot holder 21 has a fixing piece 21a formed in a collar shape and fixed to the body. The portion of the body above the fixing piece 21a is covered with a cowl top 25. With this arrangement, the cowl top 25 has a large diameter through-hole 25a so that the pivot holder 21 loosely passes therethrough.

SUMMARY OF THE INVENTION

However, known wiper devices have various problems. That is, rainwater may invade between the through-hole 25a and the pivot holder 21. The water may enter a wiper drive unit and splash on a drive link, for example. Also, foreign matter may be sucked in when a vehicle travels, i.e., by the negative pressure in an upper-section of a dash board where the wiper device is mounted. The foreign matter may invade the dash board upper section through a through-hole formed in a body exterior sheet, for example. The foreign matter may generate noise by interfering with a wiper link, a wiper arm, and the like, when the wiper device is operated.

To overcome the above problems, there has been proposed to form a large diameter regulating section to the pivot holder fixing piece so as to surround the outside periphery of the pivot holder to regulate the invasion of rainwater and foreign matters, as well as to provide a guide path for guiding and discharging invaded rainwater. However, vehicles are manufactured in two types, that is, in a left-hand-drive type and a right-hand-drive type. As a result, two kinds of the pivot holders must be used to provide a driver side pivot holder and a passenger side pivot holder to accommodate left-hand-drive vehicles and right-hand-drive vehicles. Accordingly, there arises a problem to be solved by the present invention that not only the number of parts is increased, but also the management of the parts are troublesome.

The present invention is directed to solving these problems in view of the above circumstances. In accordance with the invention, there is provided a pivot structure for a vehicle wiper device. A pivot holder, through which a pivot shaft having a wiper arm fixed thereto passes so as to rotate about the axis of the pivot shaft, is mounted by fixing a fixing piece. The fixing piece is formed on the pivot holder in a collar shape. The fixing piece is fixed to a body exterior sheet disposed below a cowl top in an inclined state. The pivot structure includes a regulating section formed on the upper surface of the fixing piece, which opposes the cowl top.

The regulating section has a large diameter so as to surround the outside periphery of the pivot holder for restricting entry of foreign substance from the cowl top. The regulating section is formed symmetrically, with respect to an imaginary line passing through the axial center of the pivot shaft, on the right side and the left side.

Further, according to the present invention, the regulating section may be divided into a plurality of portions.

According to the pivot structure for the vehicle wiper device of the present invention as described above, the invasion of foreign matters such as rainwater, dead leaves, and the like, into a dash board upper section can be regulated. Additionally, in accordance with the invention, a guide path is formed to discharge entering rainwater. Further, the pivot holder can be employed to both left-hand-drive vehicles and right-hand-driver vehicles.

BRIEF DESCRIPTION OF THE DRAWINGS

These and other aspects and advantages of the invention will become apparent from the following detailed description of exemplary embodiments when taken in conjunction with the accompanying drawings, in which like reference numerals designate like elements and wherein.

DETAILED DESCRIPTION OF PREFERRED EMBODIMENTS

While the invention will hereinafter be described in connection with exemplary embodiments thereof, it will be understood that it is not intended to limit the invention to those embodiments. On the contrary, it is intended to cover all alternatives, modifications and equivalents that may be included within the spirit and scope of the invention.

For a general understanding of the features of the invention, reference is made to the drawings. In the drawings, like reference numerals have been used throughout to designate like elements.

Figure 1:
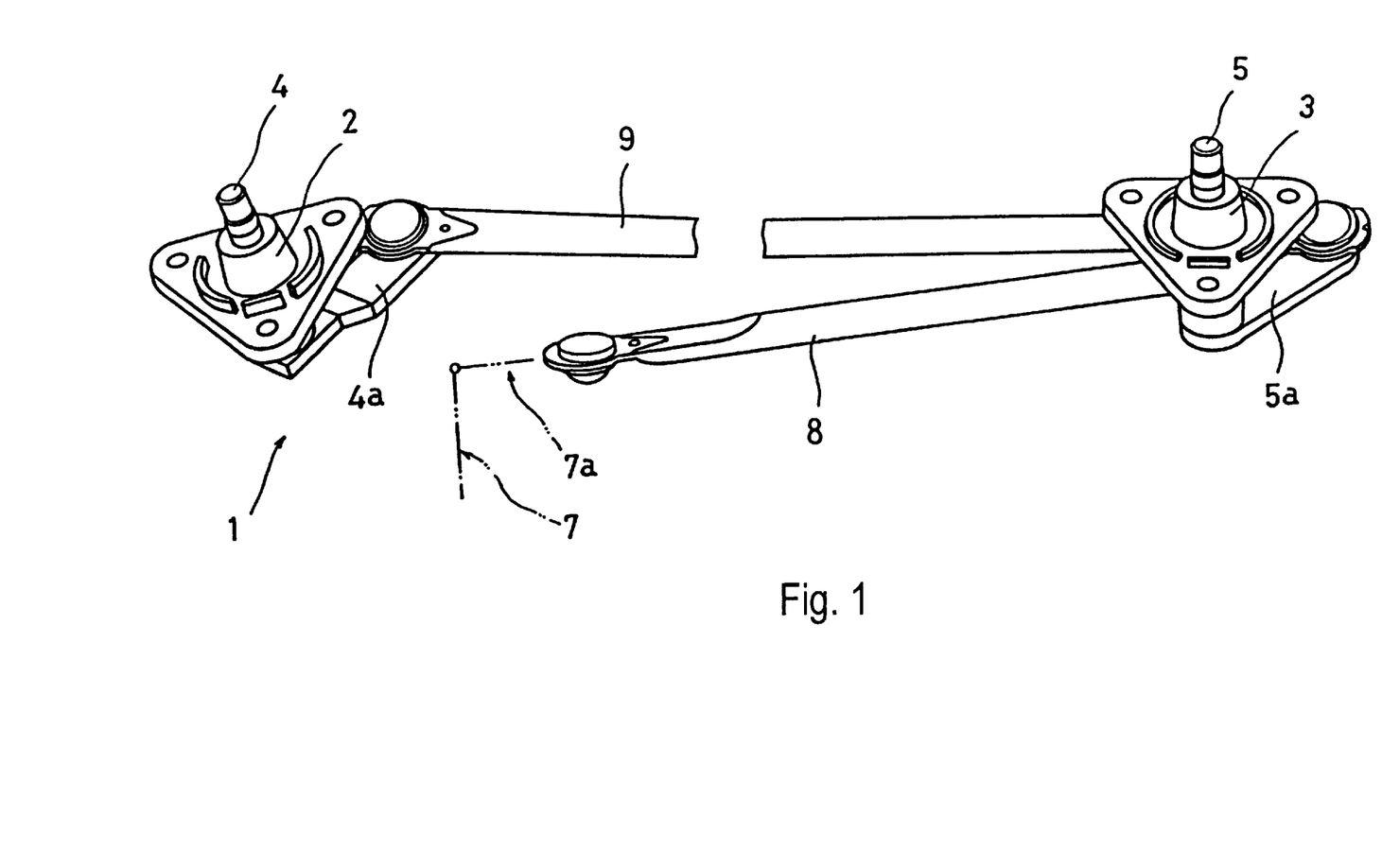
FIG. 1 is a perspective view of the main portion of a wiper device in accordance with an embodiment of invention.

A wiper device 1 is shown, in FIG. 1, for wiping the windshield of a vehicle. The wiper device 1 includes a driver side pivot holder 2 and a passenger side pivot holder 3. Pivot shafts 4, 5 pass through the pivot holders 2, 3 and are supported by the pivot holders 2, 3 so as to rotate about the axes thereof. Wiper arms 6 are fixed to the extreme ends of the pivot shafts 4, 5, respectively, whereas swing links 4a, 5a are fixed to the base ends of the pivot shafts 4, 5, respectively. As a result, the power from the output shaft 7 of a wiper motor (not shown) is transmitted to an output link 7a, a first rod 8, a passenger side swing link 4a, a second rod 9 and a driver side swing link 5a.

Figure 2A:
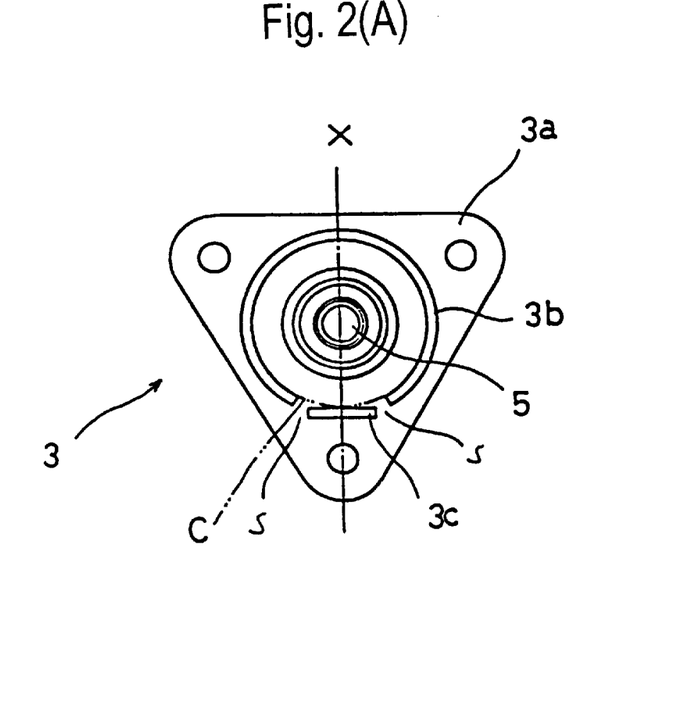
FIG. 2A is a plan view of a passenger side pivot hinge section and FIG. 2B is a plan view of a driver side pivot hinge section in accordance with an embodiment of invention.
Figure 4:
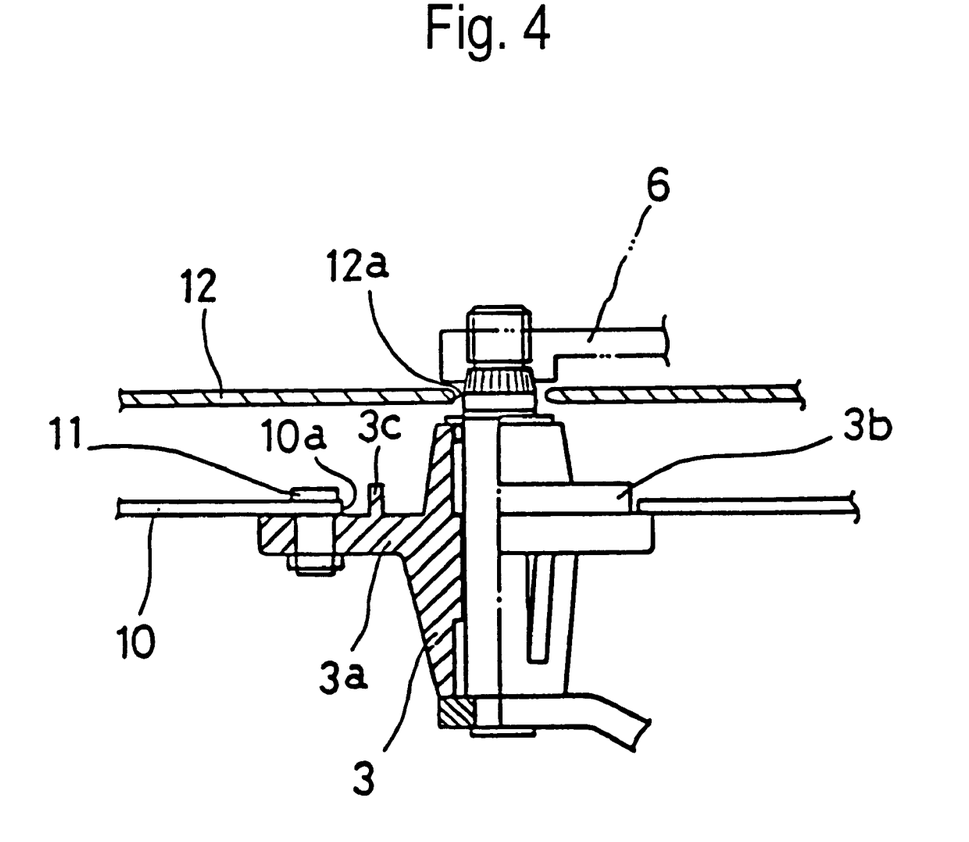
FIG. 4 is a front elevational view, partly in cross section, of the passenger side pivot hinge section in accordance with an embodiment of invention.

The passenger side pivot holder 3 will first be described, although the invention is directed to each of the pivot holders 2, 3. As shown in FIG. 2A and FIG. 4, the pivot holder 3 loosely passes through a through-hole 10a, formed in a body exterior sheet 10, from the lower side (body side) thereof. The pivot holder 3 is fixed to the body exterior sheet 10 in such a manner that a fixing piece 3a which extends from the outside periphery of the pivot holder 3, in a collar shape, is fitted to the body exterior sheet 10 inclined in a forward/backward direction from the lower side thereof. The fixing piece 3a supported by a bolt 11 as an example of a fixture.

Numeral 12 denotes a cowl top mounted above the body exterior sheet 10. The cowl top 12 has a through-hole 12a formed therein so that the pivot holder 3 loosely passes through it. First and second regulating ribs 3b and 3c are formed to the fixing piece 3a of the pivot holder 3, which confront the lower surface of the cowl top 12, respectively. The first and second regulating ribs 3b and 3c regulate the invasion of foreign matters such as dead leaves and the like into the space between the lower surface of the cowl top 12 and the fixing piece 3a. The first regulating rib 3b is formed in a substantially cylindrical shape projecting toward the cowl top 12 with a diameter larger than the outside shape of the pivot holder 3. The first regulating rib 3b has an opening formed thereto on the inclined side of the pivot holder 3. On the other hand, the second regulating rib 3c is formed linearly at the position of the opening of the first regulating rib 3b with intervals S defined between both the ends of the first regulating rib 3b and both the ends of the second regulating rib and located in the tangential direction with respect to the imaginary arc C of the first regulating rib 3b. As a result, the second regulating rib 3c forms a discharge path for discharging invaded rainwater and the like to the outside of the regulating ribs. A pair of cutout portions between the first regulating rib 3b and the second regulating rib 3c are formed substantially symmetrically with respect to an imaginary line X as a symmetrical line passing through the axial center of the pivot shaft 5 on the right side and the left side thereof. As a result, the pivot structure can be used in any left-hand-drive vehicles or right-hand-drive vehicles.

Figure 2B:
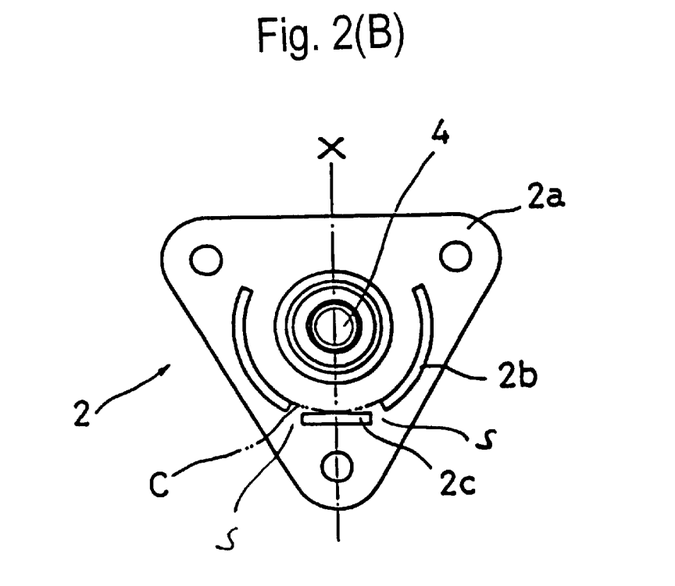
Figure 3:
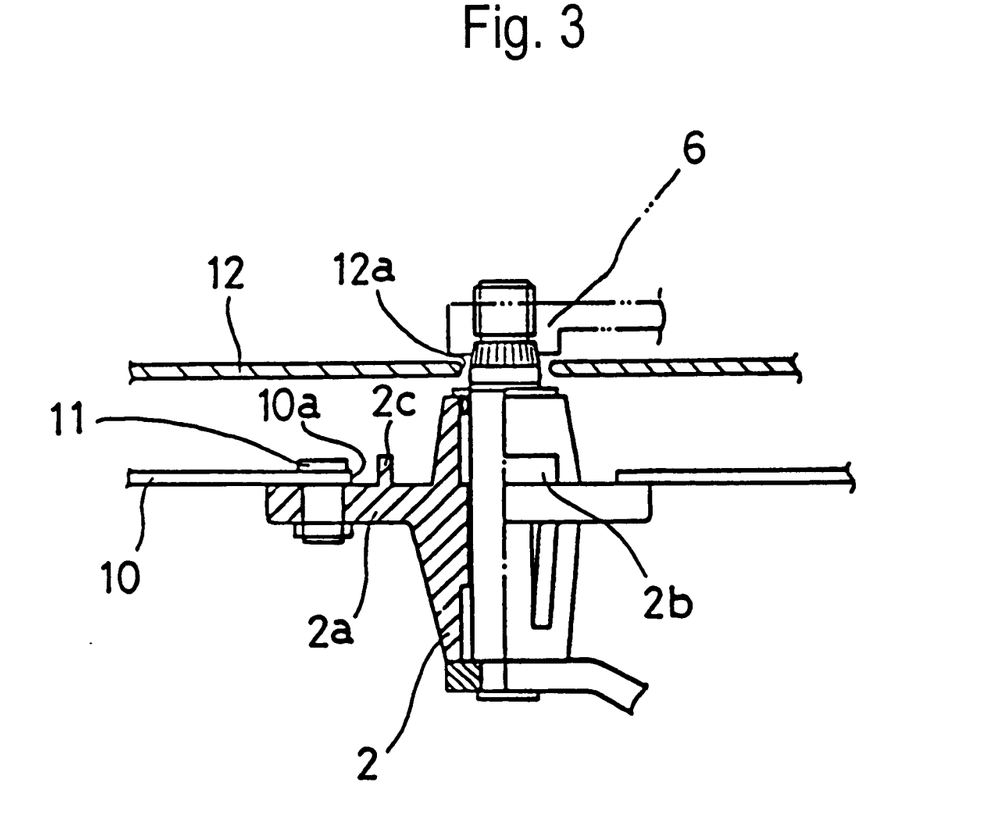
FIG. 3 is a front elevational view, partly in cross section, of the driver side pivot hinge section in accordance with an embodiment of invention.

The driver side pivot holder 2 has the same mounting structure as that of the passenger side pivot holder 3 except that it is mounted at an end of the windshield of the vehicle at the lower portion thereof and fixedly supported by being also inclined in the right and left directions in conformity with the round shapes of the body and the windshield. The regulating ribs of the pivot holder 2 will hereinafter be described. As shown in FIG. 2B and FIG. 3, first and second regulating ribs 2b and 2c are formed to the fixing piece 2a of the pivot holder 2, which confronts the lower surface of a cowl top 12. The first regulating rib 2b includes a pair of substantially arc-shaped ribs having openings at the inclined upper and lower ends thereof. The second regulating rib 2c is formed linearly at the position of the opening at the lower end of the first regulating rib 2b with intervals S defined between both the ends of the first regulating rib 2b and both the ends of the second regulating rib 2c and located in the tangential direction with respect to the imaginary arc C of the first regulating rib 2b. As a result, a discharge path is formed for discharging invaded rainwater and the like.

In the first and second driver side regulating ribs 2b and 2c, a pair of cutout portions are formed substantially symmetrically with respect to an imaginary line X as a symmetrical line passing through the axial center of the pivot shaft 4. The first and second passenger side regulating ribs 3b and 3c are likewise positioned on the right side and the left side.

When the pivot holders 2, 3 are mounted on a left-hand-drive vehicle or a right-hand-drive vehicle whose inclinations in the right and left directions are opposite to each other symmetrically with respect to a line, a discharge path is formed by one of the pair of the cutout portions and the second regulating rib. The discharge path is formed in the tangential direction to discharge invaded rainwater through the discharge path, regardless of whether the vehicle is inclined in the right direction or in the left direction. As a result, the pivot holder can be easily formed without consideration of a difference in shape, depending on its use in a left-hand-drive vehicle or a right-hand-drive vehicle.

In the wiper device arranged as described above, the window surface of the windshield is wiped by the wiper arms 6 which are swung by the reciprocating rotations of the pivot shafts 4, 5 driven by a motor (not shown). As a result of the invention, it is difficult for foreign matters such as rainwater, dead leaves and the like to invade the cowl top from the through-hole 12a. Even if foreign matter invades the cowl top, the invasion of it into a dash board upper section, located further inwardly of the cowl top, is regulated by the first and second regulating ribs 2b, 2c, 3b and 3c. The rainwater is guided and discharged to a prescribed portion through the cutout. As a result, the problem of noise generated by contact of any invaded foreign materials with an inner portion of the drive link, and the like, of the wiper drive unit is prevented.

In the wiper device to which the present invention is embodied, the invasion of the foreign matters into the inner portion of the wiper device can be prevented by the first and second regulating ribs 2b, 2c, 3b and 3c. Further, the second regulating ribs 2c, 3c are linearly formed at the positions of the openings of the first regulating ribs 2b and 3b, with the intervals S defined between both the ends of the first regulating ribs 2b and 3b and both the ends of the second regulating ribs 2c and 3c. The second regulating ribs 2c and 3c are located in the tangential direction with respect to the imaginary arcs C of the first regulating rib 2b and 3b so as to form the discharge path of the rainwater. Thus, the passage of the rainwater, for example, can be regulated. Further, the regulating ribs 2b, 2c, 3b and 3c are formed symmetrically with respect to the imaginary line X as a symmetrical line passing through the axial center of the pivot shaft on the right side and the left side. Therefore, the wiper device can be employed to any of a left-hand-drive vehicle and the right-hand-side vehicle. Further, the number of parts can be reduced and management of the parts can be simplified.

Figure 5A:
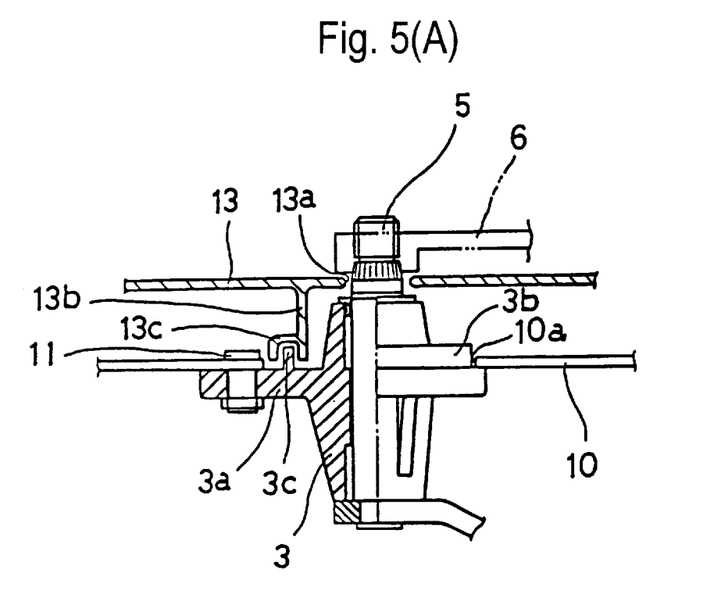
FIGS. 5A and 5B are front elevational views, partly in cross section, showing the wiper device of another embodiment of the present invention.
Figure 5B:
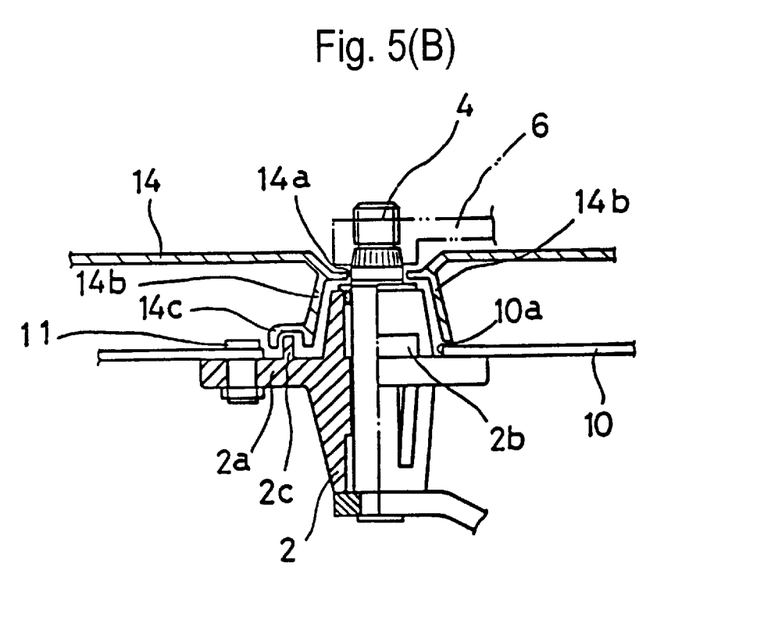

The present invention is not limited to the above embodiment. The cowl top mounted above the body exterior sheet can be devised as shown in FIG. 5A and FIG. 5B, which illustrate the wiper device of another embodiment of the present invention. More specifically, as shown in FIG. 5A, a passenger side cowl top 13 is mounted to a body exterior sheet 10, a pivot holder 3, also mounted to the body exterior sheet 10, loosely passes through the through-hole 13a of the passenger side cowl top 13. The cowl top 13 has an extending section 13b which projects downward from the surface of the cowl top 13, which confronts first and second regulating ribs 3b and 3c and extends toward the second regulating rib 3c, around the outside periphery of a pivot holder 3. The extending section 13b has a covering section 13c formed to the lower end edge thereof. The covering section 13c has a substantially gate-shaped cross section. This is provided as a result of the extending section 13b bulging to have a large diameter. The covering section 13c is fitted over the second regulating rib 3c in a labyrinth fashion.

With regard to a driver side cowl top 14, an extending section 14b projects from the through-hole 14a of the driver side cowl top 14, through which a pivot holder 2 loosely passes. The extending section 14b extends toward first and second regulating ribs 2b and 2c so as to surround the outside periphery of the pivot holder 2. The extending section 14b has a covering section 14c formed to the lower end edge thereof. The covering section 14c has a substantially gate-shaped cross section. This is provided as a result of the extending section 14b bulging to have a large diameter. The covering section 14c is fitted over the second regulating rib 2c in a labyrinth fashion.

With the above arrangements, even if foreign matters, such as dead leaves and the like, invade from the through-holes 13a and 14a of the cowl tops 13 and 14, the invasion can be regulated by not only the regulating ribs, but also the covering sections 13c and 14c of the cowl tops 13 and 14. As a result, the invasion of the foreign matters can be more reliably regulated.

Figure 6:
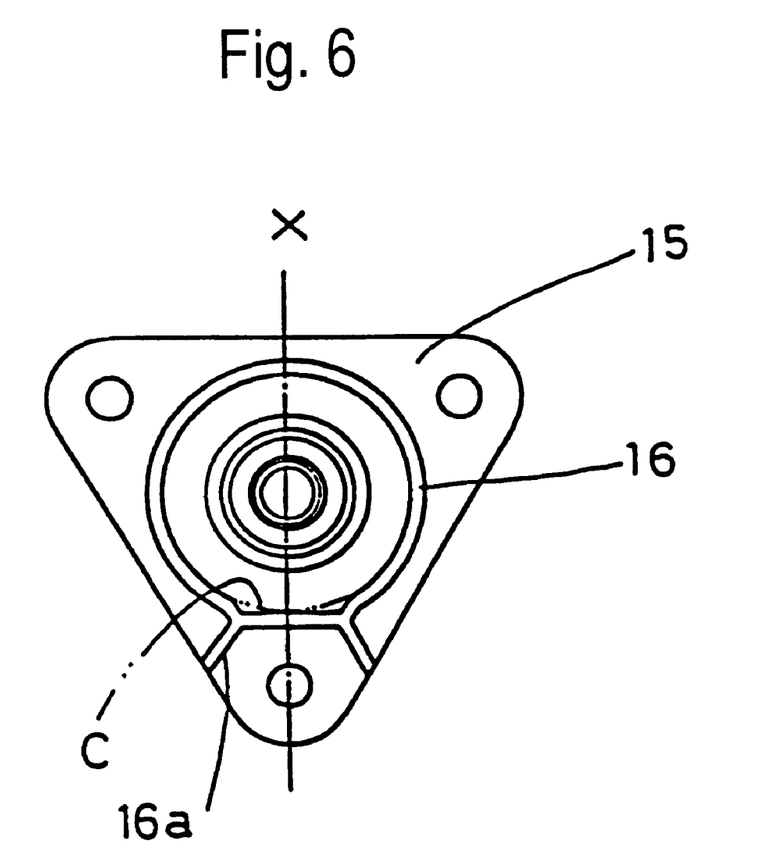
FIG. 6 is a plan view showing the wiper device of still another embodiment of the present invention.

Further, as shown in FIG. 6, an annular groove 16 may be formed on the fixing piece 15 of the pivot holder in place of the regulating rib. With this arrangement, discharge grooves 16a are formed from the annular groove 16 in a radial direction symmetrically with respect to the right and left sides. The invasion of foreign matters such as dead leaves and the like can be regulated by arranging the annular groove 16 and a projecting section extending from a cowl top downward in the labyrinth fashion.

While the invention has been described in conjunction with specific embodiments thereof, it is evident that many alternatives, modifications and variations may be apparent to those skilled in the art. Accordingly, the exemplary embodiments of the invention as set forth herein are intended to be illustrative, not limiting. Various changes may be made without departing from the spirit and scope of the invention.

What is claimed is:

1. A pivot structure for supporting a pivot shaft having a wiper arm fixed to the pivot shaft, the pivot structure comprising:
   a pivot holder having a through hole, the pivot shaft passable through the through hole of the pivot holder so as to be rotatable about an axis of the pivot shaft;
   a fixing piece formed on the pivot holder, the fixing piece having a collar shape defining an upper surface, the fixing piece mountable to a body exterior sheet disposed below a cowl top in an inclined state, the upper surface opposing the cowl top, the fixing piece including a regulating section formed on the upper surface of the fixing piece, the regulating section is formed so as to at least partially surround and to be spaced from an outside periphery of the pivot holder for restricting a foreign substance invaded into a dashboard upper section from the cowl top;
   wherein said regulating section is formed symmetrically on left and right sides with respect to an imaginary line passing through the axial center of the pivot shaft.

2. The pivot structure according to claim 1, wherein said regulating section is divided into a plurality of portions.

3. A pivot structure for supporting a pivot shaft having a wiper arm fixed to the pivot shaft, the pivot structure comprising:
   a pivot holder having a through hole, the pivot shaft passable through the through hole of the pivot holder so as to be rotatable about an axis of the pivot shaft;
   a fixing piece formed on the pivot holder, the fixing piece having a collar shape defining an upper surface, the fixing piece including a regulating section formed on the upper surface of the fixing piece, the regulating section surrounding the outside periphery of the pivot holder;
   wherein said regulating section is formed symmetrically on left and right sides with respect to an imaginary line passing through the axial center of the pivot shaft, the regulating section and includes at least one first regulating rib and a second regulating rib, the first regulating rib extends around the through hole in the pivot holder to form at least a portion of an arc.

4. The pivot structure according to claim 3, wherein the fixing piece is mountable to a body exterior sheet disposed below a cowl top in an inclined state, the upper surface opposing the cowl top.

5. The pivot structure according to claim 3, wherein the at least one first regulating rib comprises two regulating ribs.

6. The pivot structure according to claim 5, wherein the second regulating rib is disposed between respective terminal ends of the two regulating ribs.

7. The pivot structure according to claim 3, wherein the second regulating rib extends in a straight line.

8. The pivot structure according to claim 1, wherein the regulating section includes a first regulating rib and a second regulating rib.

9. The pivot structure according to claim 8, wherein the first regulating rib is formed into two segments.

10. The pivot structure according to claim 8, wherein the second regulating rib is disposed between respective terminal ends of the two regulating ribs.

11. The pivot structure according to claim 8, wherein the second regulating rib extends in a straight line.

12. A pivot structure for supporting a pivot shaft to a support structure, the pivot structure comprising:
   a pivot holder having a hole for receiving the pivot shaft;
   a fixing piece surrounding the pivot holder for mounting to the support structure; and
   a regulating section extending from a surface of the fixing piece to at least partially circumscribe the pivot holder, the regulating section is symmetrical to an imaginary plane passing through and containing the axis of the pivot shaft.

13. The pivot structure according to claim 12, wherein the regulating section includes a first regulating rib and a second regulating rib.

14. The pivot structure according to claim 13, wherein the first regulating rib comprises two regulating rib segments.

15. The pivot structure according to claim 13, wherein the second regulating rib is disposed between respective terminal ends of the two regulating segments.

16. The pivot structure according to claim 13, wherein the second regulating rib extends in a straight line.

* * * * *